United States Patent
Ravikant et al.

(10) Patent No.: US 10,169,798 B2
(45) Date of Patent: Jan. 1, 2019

(54) AUTOMATIC SELECTION OF FEATURED PRODUCT GROUPS WITHIN A PRODUCT SEARCH ENGINE

(71) Applicant: Wal-Mart Stores, Inc., Bentonville, AR (US)

(72) Inventors: Dintyala Venkata Subrahmanya Ravikant, Fremont, CA (US); Abhishek Gattani, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1146 days.

(21) Appl. No.: 14/295,195

(22) Filed: Jun. 3, 2014

(65) Prior Publication Data

US 2015/0348160 A1 Dec. 3, 2015

(51) Int. Cl.
*G06Q 30/06* (2012.01)
(52) U.S. Cl.
CPC ..... *G06Q 30/0627* (2013.01); *G06Q 30/0631* (2013.01)
(58) Field of Classification Search
CPC .......................................... G06Q 30/06–30/08
USPC ................................................. 705/26.1–27.2
See application file for complete search history.

(56) References Cited

U.S. PATENT DOCUMENTS

| | | | |
|---|---|---|---|
| 7,996,282 B1 * | 8/2011 | Scott | G06Q 30/06 705/27.1 |
| 8,548,876 B1 | 10/2013 | Fox et al. | |
| 2005/0222987 A1 * | 10/2005 | Vadon | G06F 17/30997 |
| 2006/0162071 A1 * | 7/2006 | Dixon | G06Q 30/02 5/93.1 |
| 2007/0094066 A1 * | 4/2007 | Kumar | G06Q 10/04 706/61 |
| 2011/0213679 A1 * | 9/2011 | Petkov | G06Q 30/02 705/27.1 |
| 2012/0246026 A1 | 9/2012 | Xu et al. | |

OTHER PUBLICATIONS

Tamara Sterm, Set Cover Problem, Feb. 9, 2006 available at https://math.mit.edu/~goemans/18434506/setcover-tamara.pdf.*

(Continued)

*Primary Examiner* — Ming Shui
(74) *Attorney, Agent, or Firm* — Bryan Cave Leighton Paisner LLP

(57) ABSTRACT

A method of computing a featured set of product groups for a query on an inventory of products. Each of the products can have one or more attribute-value pairs. Each of the one or more attribute-value pairs can have an attribute. The method can include determining a result group of the products matching the query. The method also can include determining relevance scores for the product groups. The method further can include determining a featured attribute and the featured set of the product groups for the featured attribute. The method also can include, after receiving the query from a user, transmitting for display at least one page of a website, where the at least one page has an option to view each of the product groups of the featured set of the product groups that has been selected. Other embodiments of related systems and methods are also disclosed.

20 Claims, 7 Drawing Sheets

(56) References Cited

OTHER PUBLICATIONS

Search Engines Evaluation, Rakesh Kumar, P.K. Suri, & R.K. Chauhan, DESIDOC Bulletin of Information Technology, vol. 25, No. 2, Mar. 2005, pp. 3-10.*
Branch and Bound Algorithms—Principles and Examples, Jens Clausen, Mar. 12, 1999.*

* cited by examiner

AUTOMATIC SELECTION OF FEATURED PRODUCT GROUPS WITHIN A PRODUCT SEARCH ENGINE

TECHNICAL FIELD

This disclosure relates generally to commerce in a computer network system, and relates more particularly to automatic selection of featured groups of products.

BACKGROUND

Modern consumers have a plethora of choices when selecting products to purchase. When shopping online for a particular type of item, consumers often have a general idea of what they want, but often would like to drill down into subcategories. For example, a search for a television (TV) can yield thousands of products. Vertical search engines generally have a notion of grouping products. For example, a search portal on an eCommerce website can include subcategories, such as subcategories of "LCD," "LED," and "Plasma" for the TV search. These subcategories can highlight relevant subcategories of products, summarize matching products, and/or enhance user experience, such as by assisting consumers to more easily and/or rapidly see products that are relevant to their interests. Selection of featured subcategories is typically done manually by merchants or product experts. These subcategories can help consumers and are often among the most commonly selected portions of search results web pages.

It can be expensive for merchants and/or product experts to manually generate and/or update featured subcategories, especially for websites with large product repositories and/or frequent changes in product inventory and/or consumer shopping behaviors. Past attempts at automated creation of featured subcategories have involved automated selection of attribute values to be used as subcategories, but have nonetheless required merchants and/or product experts to manually select one or more relevant product attributes to be used for the automated attribute-value selection. For example, the merchant would manually select "display technology" as a relevant selection attribute for TVs prior to the automated selection of the "LCD," "LED," and "Plasma" attribute values as featured subcategories. This manual selection can be expensive.

BRIEF DESCRIPTION OF THE DRAWINGS

To facilitate further description of the embodiments, the following drawings are provided in which.

Figure 1:
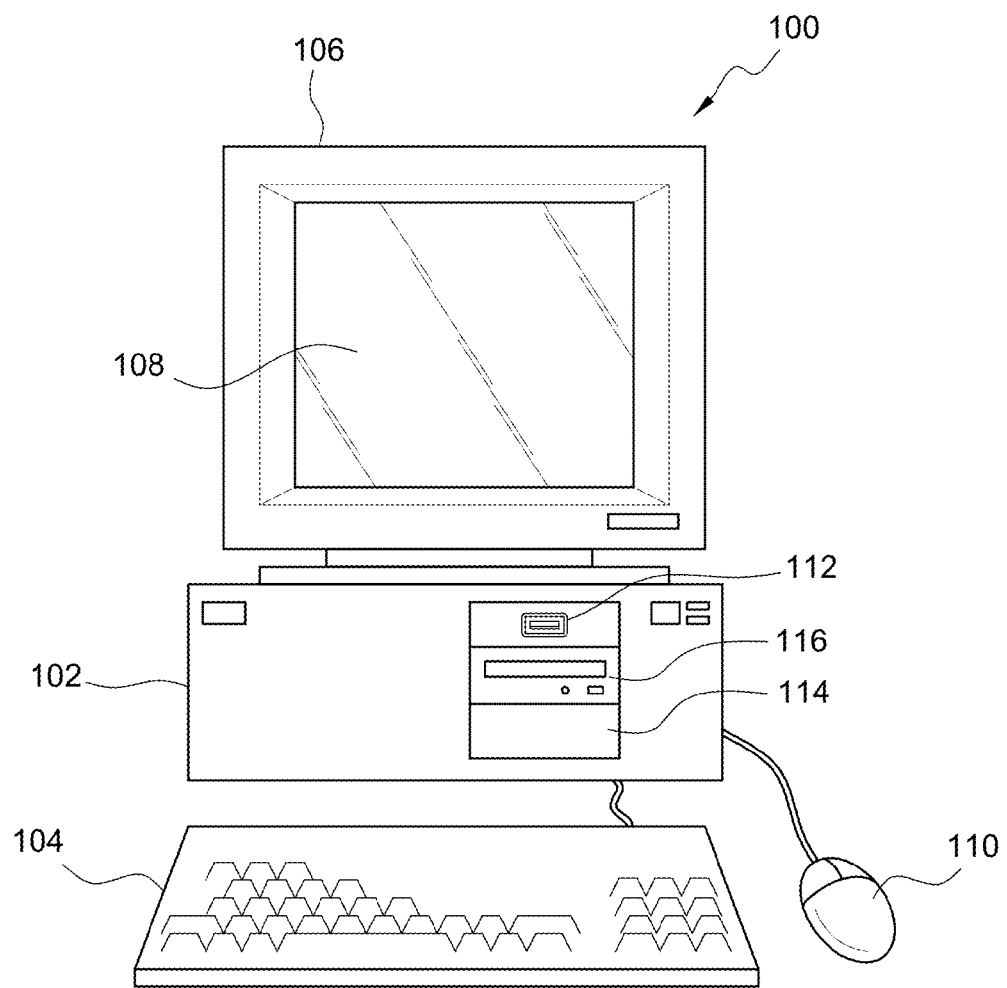
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method of computing a featured set of product groups for a query on an inventory of products. Each of the products can have one or more attribute-value pairs. Each of the one or more attribute-value pairs can have an attribute. The method can be implemented via execution of computer instructions configured to run at one or more processing modules and configured to be stored at one or more non-transitory memory storage modules. The method can include determining via a search engine a result group of the products matching the query. The result group of the products can collectively have a result set of the attributes and a result set of the one or more attribute-value pairs. The method also can include determining relevance scores for the product groups. Each of the products in each of the product groups can have a common attribute of the result set of the attributes and a common attribute-value pair associated with the common attribute. The method further can include determining a featured attribute and the featured set of the product groups for the featured attribute. Each of the product groups of the featured set of the product groups can have the featured attribute and can have a different one of the one or more attribute-value pairs associated with the featured attribute. The method also can include, after receiving the query from a user, transmitting for display at least one page of a website, where the at least one page has an option to view each of the product groups of the featured set of the product groups that has been selected.

A number of embodiments include a system for computing a featured set of product groups for a query on an inventory of products. Each of the products can have one or more attribute-value pairs. Each of the one or more attribute-value pairs can have an attribute. The system can include one or more processing modules and one or more non-transitory memory storage modules storing computing instructions configured to run on the one or more processing modules. The computing instruction can perform the act of determining via a search engine a result group of the products matching the query. The result group of the products can collectively have a result set of the attributes and a result set of the one or more attribute-value pairs. The computing instruction also can perform the act of determining relevance scores for the product groups. Each of the products in each of the product groups can have a common attribute of the result set of the attributes and a common attribute-value pair associated with the common attribute. The computing instructions further can perform the act of determining a featured attribute and the featured set of the product groups for the featured attribute. Each of the product groups of the featured set of the product groups can have the featured attribute and can have a different one of the one or more attribute-value pairs associated with the featured attribute. The computing instruction also can perform the act of, after receiving the query from a user, transmitting for display at least one page of a website, where the at least one page has an option to view each of the product groups of the featured set of the product groups that has been selected.

Embodiments include algorithmically generating a featured group of products for broad queries based on relevance and/or user engagement. For queries with a high number of matching products, featured product groups can present a natural way to summarize products and enable users to drill down and refine their query intent. Embodiments include an algorithmic approach to automatically generate featured product groups by analyzing product attributes and values, as well as coverage and engagement.

Figure 2:
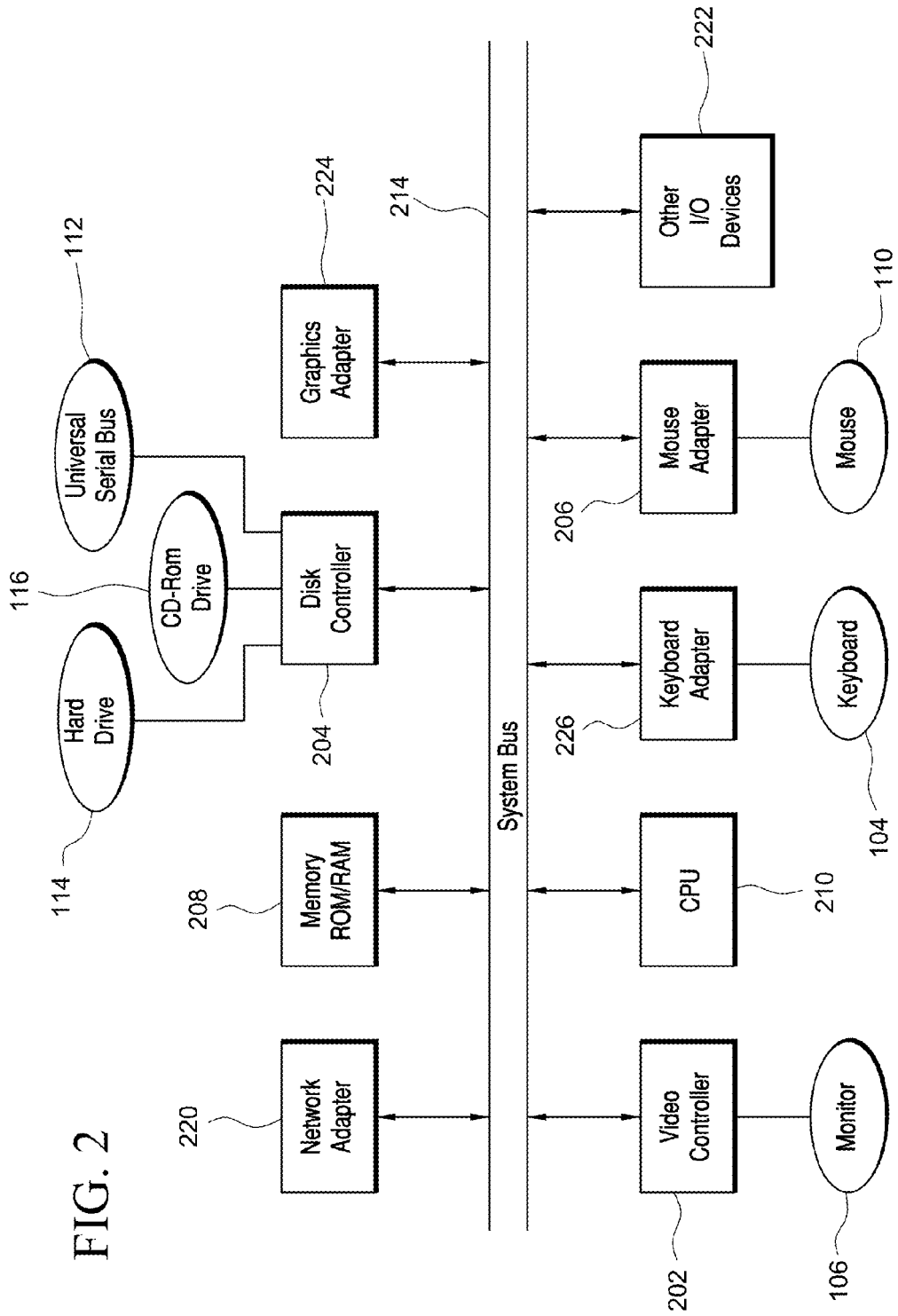
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM or DVD drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
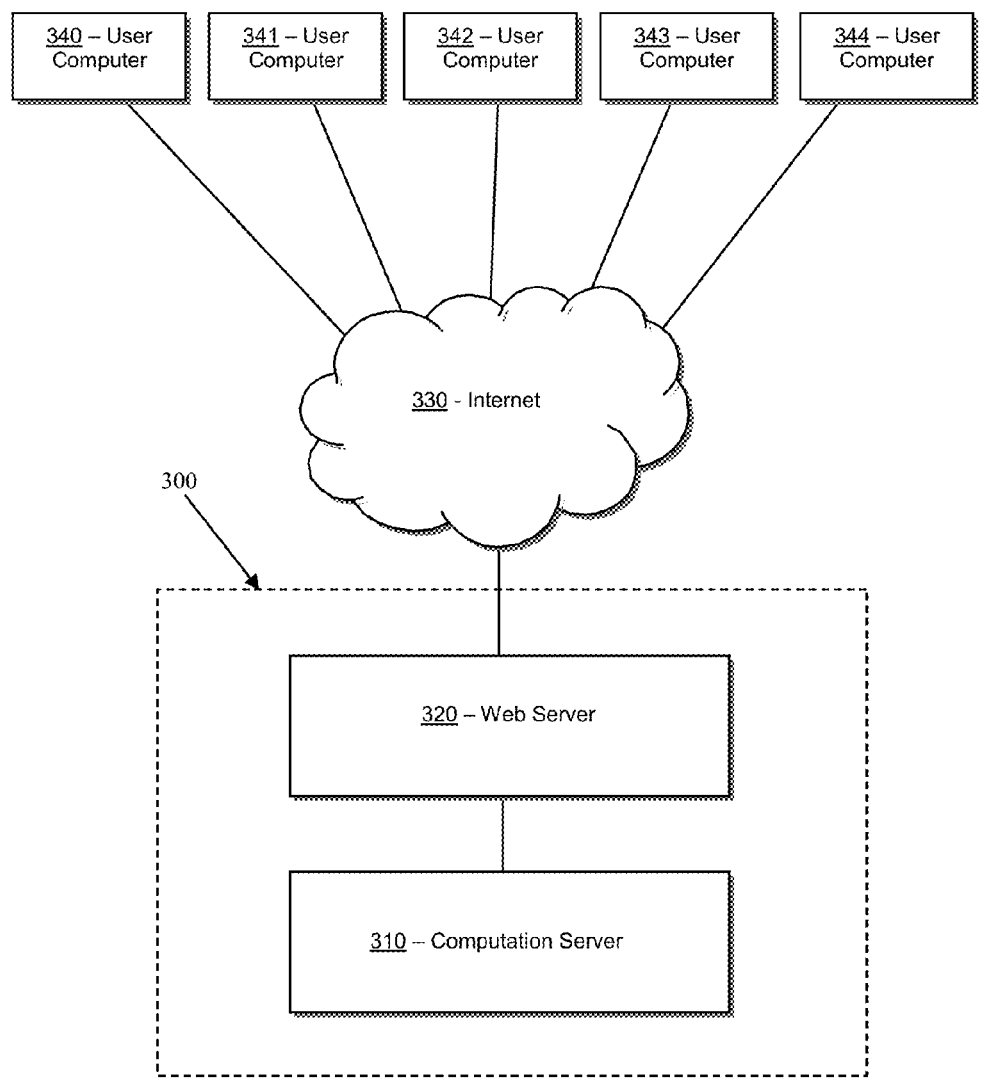
FIG. 3 illustrates a block diagram of an example of a system for automatic section of featured product groups, according to an embodiment.

Turning ahead in the drawings, FIG. 3 illustrates a block diagram of a system 300 that can be employed for automatic selection of featured product groups, according to an embodiment. System 300 is merely exemplary and embodiments of the system are not limited to the embodiments presented herein. The system can be employed in many different embodiments or examples not specifically depicted or described herein. In some embodiments, certain elements or modules of system 300 can perform various procedures, processes, and/or activities. In other embodiments, the procedures, processes, and/or activities can be performed by other suitable elements or modules of system 300. In some embodiments, system 300 can include a computation server 310 and/or a web server 320. Web server 320 and/or computation server 310 can each a computer system, such as computer system 100 (FIG. 1), as described above, and can each be a single computer, a single server, or a cluster or collection of computers or servers, or a cloud of computers or servers. Additional details regarding computation server 310 and web server 320 are described herein.

In some embodiments, web server 320 can be in data communication through Internet 330 with user computers (e.g., 340, 341, 342, 342, 344). In certain embodiments, user computers 340-344 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities. In various embodiments, each product sold through the website can include a title, an image, a free form description, and/or a structure map of attributes and values. For example, a certain TV product can have, at least in part, the following attributes and values:

| ATTRIBUTE | VALUE |
| --- | --- |
| Brand | Sceptre |
| Color | Black |
| Screen Size | 30"-39" |
| Screen Size Raw Unit | " |
| Refresh Rate | 60 Hz |
| Category | TV |

Each set of attributes and values is an attribute-value pair. For example, "Brand" is an attribute, and "Sceptre" is the value associated with the attribute, such that "Brand" and "Sceptre" form an attribute-value pair. In many embodiments, products that can be searched on the website can include non-physical goods, virtual goods, services, online video portals, travel options, hotel/vacation rentals, events, etc.

After receiving a query for TVs and determining the result group of products, for example, system 300 can encode a web page, such as web page 400 (FIG. 4, described below) to display all or some of the products on a user computer (e.g., 340-344). In a number of embodiments, system 300 can determine product groups. In various embodiments, a product group can be a group of products related to a query and a category. A product group can be defined as a semi-structured query, such as free form text, and hard conditions on the attributes and values of products. The content of a product group can be dynamic and can change with the inventory. For example, if a user searches with a search query of "TVs," system 300 can determine a result group of 1,500 TV products from the inventory that match the "TVs" query. A product group within the TV group can be TV products having a screen size of 30"-39", which can be a product group based on the attribute of Screen Size and a value of 30"-39". Other product groups based on the attribute of Screen Size within the TV result group can be based on the values of 20"-29" and 40"-49", for example. Other product groups can be based on other attributes. For example, a product group can be based on the attribute of Brand, and can have a value of Sceptre. Products in this product group would include those TVs having a brand of Sceptre. Other product groups based on the attribute of Brand can include the values of Samsung, Visio, LG, Sony, and RCA, for example.

In many embodiments, product groups can be broad. For example, a search query of Disney can yield many various products. Many or all of these products can each have an attribute of Category, which represents a broad categorization of the type of product. Exemplary values associated with the attribute of Category can include Shows, Movies, Stuffed Animals, Apparel, Video Games, and Toys. In many embodiments, the number of possible product groups within a result group of products that match the search query can be large. In a number of embodiments, system 300 can support multi-valued attributes, such as type, finer category, artist, and age group. In several embodiments, product groups can overlap with each other.

Figure 4:
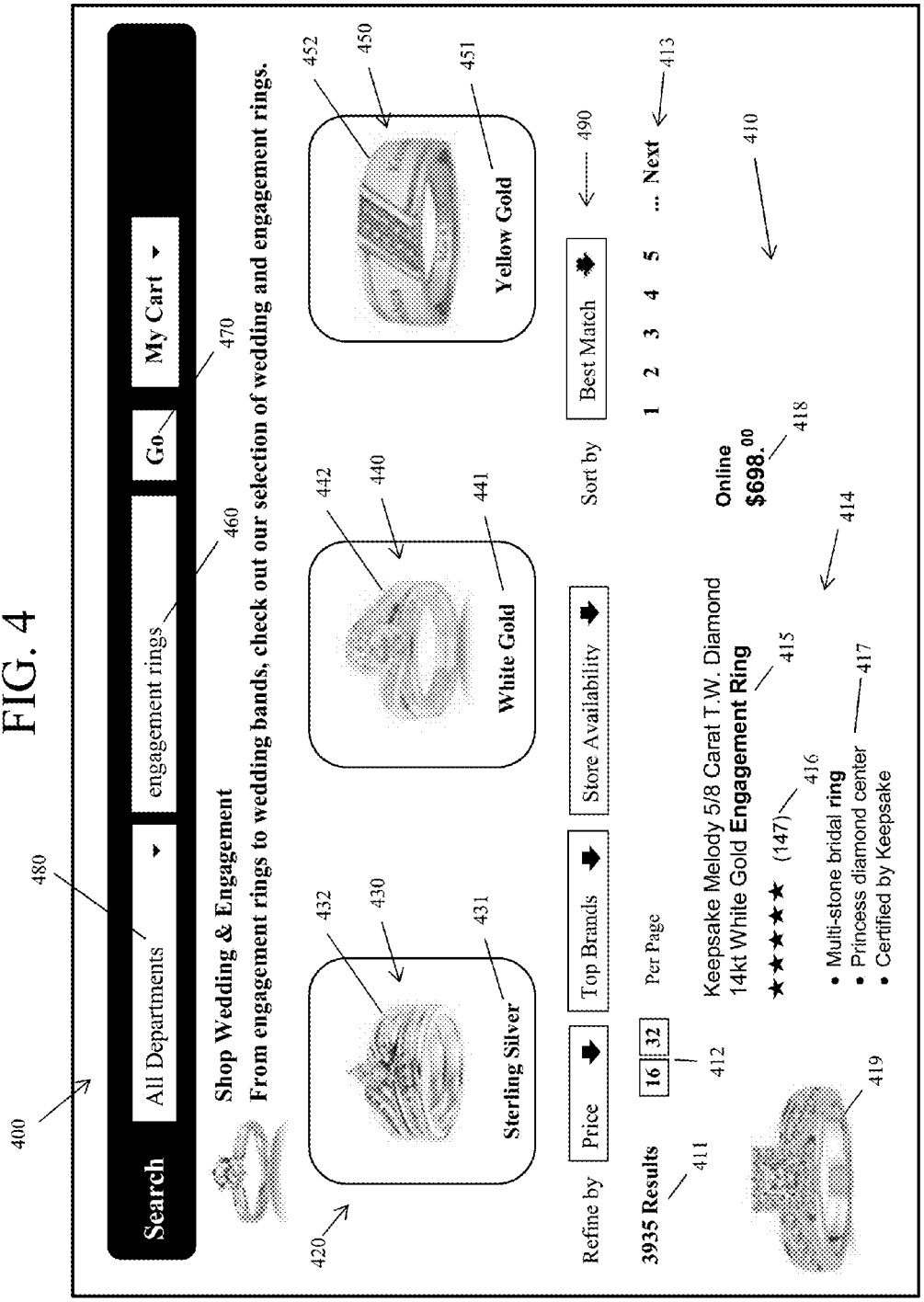
FIG. 4 illustrates a portion of an exemplary web page showing a portion of a result group of products and a featured set of product groups, according to another embodiment.

In a number of embodiments, system 300 can determine a set of the product groups that can be featured on the web page that lists the result group of products, such as web page 400 (FIG. 4, described below). In various embodiments, the number of featured product groups can be a limited number of product groups, such as 2, 3, 4, 5, 6, 7, 8, 9, 10, or more product groups. In many embodiments, the featured set of product groups can be product groups that are of particular relevance to users.

Turning ahead in the drawings, FIG. 4 illustrates a portion of an exemplary web page 400 showing a portion of a result group of products 410 and a featured set of product groups 420. Web page 400 is merely exemplary, and embodiments for selecting featured product groups can be employed in many different embodiments or examples not specifically depicted or described herein. In some embodiments, web server 320 (FIG. 3) can provide a web page, such as web page 400, to one or more of user computers (e.g., 340-344 (FIG. 3)), which can allow a user to enter a search query. For example, web page 400 can include a search box 460 in which the user can enter the search query. In various embodiments, web page 400 can display the search query in search box 460 as the user types in the search query. In many embodiments, a user can indicate completion of a search query by selecting a button 470, hitting the ENTER key on the user's keyboard, or another suitable method of indicating that the search query is complete, upon which the search query can be sent from the user computer (e.g., 340-344 (FIG. 3)) to web server 320 (FIG. 3).

In many embodiments, after receiving a query from the user computer (e.g., 340-344 (FIG. 3)), web server 320 (FIG. 3) and/or computation server 310 (FIG. 3) can determine a featured set of product groups, such as featured set of product groups 420, to display, based on the search query. In many embodiments, the featured set of product groups (e.g., 420) to be displayed for each search query can be pre-determined prior to receiving the search query from the user. In many embodiments, system 300 (FIG. 3) can pre-determine a featured set of product groups (e.g., 420) for a pre-determined number of search queries, such as 1,000 or more search queries, for example. In many embodiments, system 300 (FIG. 3) can pre-determine the featured set of product groups (e.g., 420) for common search queries that yield a large number of products in the result group. In a number of embodiments, system 300 (FIG. 3) can encode web page 400 and send web page 400 to the user computer (e.g., 340-344 (FIG. 3)) for display, such as on a video display of the user computer (e.g, 340-344 (FIG. 3)).

In some embodiments, the user can select a category in a category selector 480 on web page 400. In many embodiments, the category can be a broad category, such as a department in a department store. For example, categories could include clothing, electronics, grocery, home improvement, jewelry, toys, etc. In a number of embodiments, the default category selection in category selector 480 can include all departments, as shown in FIG. 4. The category selected in category selector 480 can further limit the search results in the result group.

As a non-limiting example, as shown in FIG. 4, the user can navigate to web page 400, can use the default category selection of "all departments" in category selector 480, and can enter a search query of "engagement rings" in search box 460. In response to selecting button 470, the search query of "engagement rings" can be sent to web server 320 (FIG. 3), which in response can send web page 400 to the user computer (e.g., 340-344 (FIG. 3), showing a portion of the result group of products 410, which can include products that match the search query. Web page 400 can include an indicator of the total number of products in the result group (e.g., 410). In some embodiments, web page 400 can display a pre-determined number of products on each page, which can be selected by a product page quantity selector 412. In many embodiments, a user can navigate to other pages of result group of products 410 by a page selector 413. A first product in result group of products 410 can be product 414, for example. Each product displayed on web page 400, such as product 414, can include product information, such as a title 415, a rating 416, a description 417, a price 418, an image 419, and/or other suitable product information. Product 414 can include a set of attribute-value pairs, as described above. In various embodiments, products (e.g., 414) in the result group (e.g., 410) can be filtered and/or sorted by one or more filter and/or sorting selectors 490.

Web page 400 also can include featured set of product groups 420, which can include a featured product group 430, a featured product group 440, and/or a featured product group 450. In various embodiments, each featured product group (e.g., 430, 440, 450) can be displayed with a featured product group descriptor, such as featured product group descriptors 431, 441, and 451 for featured product groups 430, 440, and 450, respectively. In many embodiments, each featured product group (e.g., 430, 440, 450) can be displayed with a featured product group image, such as featured product group images 432, 442, and 452 for featured product groups 430, 440, and 450, respectively. In some embodiments, the featured product group image (e.g., 432, 442, 452) can be an image (e.g., image 419) associated with a product (e.g., 414) in the featured product group (e.g. 430, 440, 450), such as a best-selling product in the featured product group (e.g., 430, 440, 450). The number of featured product groups (e.g., 430, 440, 450 shown in the example of FIG. 4 is three, but other embodiments can include other more or less featured product groups. For the search query of "engagement rings," featured product group 430 can be for a "Sterling Silver" product group, which can include products in result group 410 that match the "engagement ring" search query and also have a value of "Sterling Silver" for an attribute of "Metal Type." Featured product group 440 can be for a "White Gold" product group, which can include products in result group 410 that match the "engagement ring" search query and also have a value of "White Gold" for an attribute of "Metal Type." Featured product group 450 can be for a "Yellow Gold" product group, which can include products in result group 410 that match the "engagement ring" search query and also have a value of "Yellow Gold" for an attribute of "Metal Type." For each of the featured product groups (e.g., 430, 440, 450) in featured set of product groups 420, the featured attribute can be "Metal Type," but the value associated with the featured attribute of "Metal Type" (in the attribute-value pair) is different for each featured product group (e.g., "Sterling Silver," "White Gold," or "Yellow Gold.").

In several embodiments, system 300 (FIG. 3) can determine which featured attribute and which attribute-value pair to select as featured product groups (e.g., 430, 440, 450) from among all the product groups in the result group (e.g., 410) that matches the search query. In many embodiments, the selection can occur prior to receiving the search query from the user. In other embodiments, the selection can occur after receiving the search query from the user. In many embodiments, selecting featured product groups can be approached as an optimization problem. A relevance function can be designed to capture the quality of a combination of query and feature groups. System 300 (FIG. 3) can implement algorithms to find a combination of product groups that maximizes the relevance function. Relevance functions can take the form of a weighted set cover. For example, in one embodiment, relevance (query, {pg1, pg2, . . . , pgN})=sum of relevance over all products in (pg1∪pg2∪ . . . ∪pgN) relevanceBase (query, product), where pgX=product group X, N=the number of product groups included in the set, and relevanceBase is a scoring function; and (1) no two product groups overlap by more than x %, (2) the product groups cover y % of the result group, and (3) each group has a representative (e.g, best-selling) product within the top K searches results in the result group. In certain embodiments, x can be 50% of the products. In other embodiments, x can be 5% to 80%. In certain embodiments, y can be 30%. In other embodiments, y can be 10% to 90%.

Figure 5:
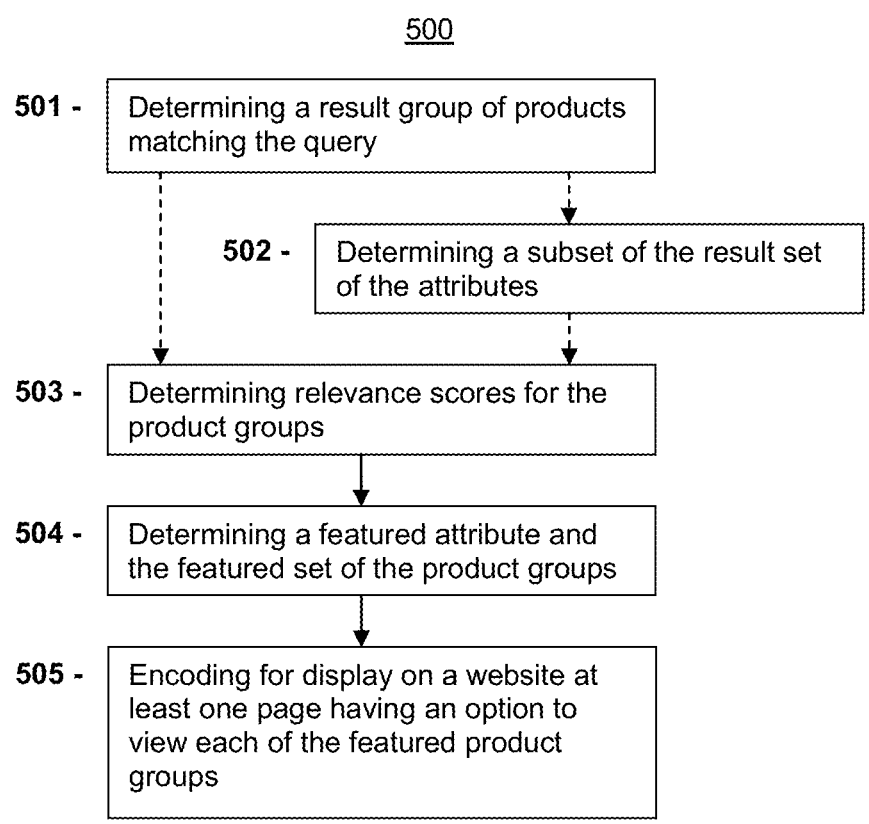
FIG. 5 illustrates a flow chart for an exemplary method of selecting, from product groups of products, a featured set of the product groups for a query, according to another embodiment.

Turning ahead in the drawings, FIG. 5 illustrates a flow chart for a method 500 of computing a featured set of product groups for a query on an inventory of products, according to an embodiment. Each of the product can have one or more attribute-value pairs, and each of the one or more attribute-value pairs can have an attribute. In other embodiments, method 500 can be a method of selecting, from product groups of products, a featured set of the product groups for a query, according to an embodiment. Each of the products can have attributes and attribute-value pairs. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In some embodiments, method 500 can be implemented by computation server 310 (FIG. 3) and/or web server 320 (FIG. 3).

Referring to FIG. 5, in some embodiments method 500 can include block 501 of determining a result group of the products matching the query. The result group can be identical or similar to result group 410 (FIG. 4). In a number of embodiments, block 501 can be performed via a search engine. In some embodiments, block 501 can be performed for many common search queries and/or pre-computed before receiving the query from a user. In other embodiments, block 501 can be performed on a search query received from a user. In many embodiments, the result group of products can collectively have a result set of attributes and a result set of attribute-value pairs. For example, a query of "TVs," can include many TV products, each with attributes and attribute-value pairs. The result set of attributes can include the union of all attributes among the TV products, and/or the result set of attribute-value pairs can include the union of all attribute-value pairs among the TV products. In several embodiments, the search engine can be a vertical search engine. In various embodiments, the search engine can be tuned for high precision rather than high recall. As is known in the art, precision is a measure of the percentage of products in the result set of products that are relevant to the search query. On the other hand, recall is a measure of the percentage of relevant documents that are retrieved in the search.

Figure 6:
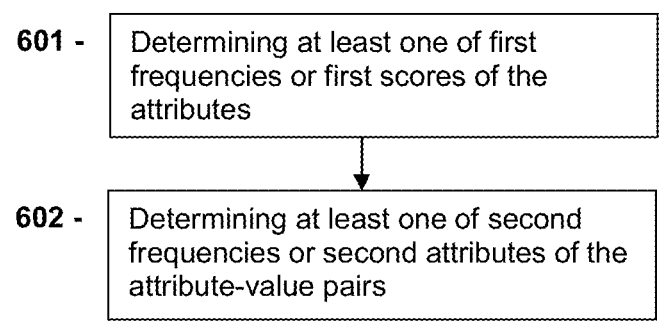
FIG. 6 illustrates a flow chart for an exemplary procedure of determining a subset of the result set of attributes, according to the embodiment of FIG. 5.

In a number of embodiments, method 500 can optionally include block 502 of determining a subset of the result set of attributes. In many embodiments, the subset of the result set of attributes can include the most relevant attributes, which can beneficially limit the number of attributes that need to be considered in blocks 503 and 504, which can reduce processing time. For example, the attributes in the subset of the result set of attributes can be attributes with the highest frequency among the products, attributes with the highest frequencies of attribute-value pairs, attributes with greatest coverage, and/or entropy of attribute-value clusters for the attributes. For example, block 502 of determining a subset of the result set of attributes can be implemented as shown in FIG. 6 and described below. In many embodiments, the attributes in the attribute set of attributes can be prioritized based on one or more of these factors.

In many embodiments, method 500 can include block 503 of determining relevance scores for the product groups. In many embodiments, each of the products in each of the product groups can have a common attribute of the result set of attributes and a common attribute-value pair associated with the common attributes. For example, a product group can include products with a common attribute of Screen Size, and an common attribute-value pair of Screen Size=30"-39". In certain embodiments, block 503 can include iterating through each of the attributes in the subset of the result set of attributes determined in block 502 to determine, for each of the attributes, the relevance scores for product groups in which all of the products have the attribute. For example, in some embodiments, system 300 (FIG. 3) can determine relevance scores only for product groups having attributes in the subset of the result set of attributes. In other embodiments, system 300 (FIG. 3) can determine relevance scores for all product groups in the result set of products. In many embodiments, for each attribute, such as the attribute of Screen Size for a product query of TVs, system 300 (FIG. 3) can determine relevance scores for each of the product groups with difference values of Screen Size, such as 20"-29", 30"-39", 40"-49", 50"-59", 60"-69", etc.

In a number of embodiments, block 503 can include determining, for each of the product groups, the relevance score based on one or more factors. For example, the relevance score for a product group can be based at least on a textual matching of the products in the product group with the query, such as how well the query matches the title, description, and/or attributes of the products in the product group. As another example, the relevance score for a product group can be based at least on a revenue of the products in the product group, such as how much revenue has been received from the product group over a period of time, such as the past 60 days. In a number of embodiments, the revenue can be adjusted by a decay function, such that more recent revenue has a higher weightage in the relevance score. As a further example, the relevance score for a product group can be based at least on a coverage of the result group by the products in the product group, such as the number and/or fraction of the result group covered by the products in the product group. As yet another example, the relevance score for a product group can be based at least on a quantity of clicks on the products in the product group, such as how many clicks have been made for the products in the product group over a period of time, such as the past 60 days. In a number of embodiments, the quantity of clicks also can be adjusted by a decay function, such that more recent clicks have a higher weightage in the relevance score. As yet a further example, the relevance score for a product group can be based at least on a user engagement measure for the products in the product group. In various embodiments, the user engagement measure can include a combination of at least the quantity of clicks on the products in the product group, a quantity of cart adds for the products in the product group, and/or a quantity of orders of the products in the product group.

In some embodiments, block 503 can include determining a representative product image to use for the product group. For example, the representative product image can be an image (such as image 419 (FIG. 4)) associated with the best-selling product within the product group.

In a number of embodiments, method 500 can include block 504 of determining a featured attribute and the featured set of product groups for the featured attribute. The featured set of product groups can be identical or similar to featured set of product groups 420 (FIG. 4). In many embodiments, each of the product groups of the featured set of product groups can have the featured attribute and a different one of the attribute-value pairs associated with the featured attribute. For example, the featured set of products can all have a featured attribute of Screen Size, and the product groups can be for attribute-value pairs of Screen Size=20"-29", Screen Size=30"-39", and Screen Size=40"-49".

In various embodiments, block 504 can be based at least in part on a maximum relevance coverage of the featured set of the product groups. In many embodiments, featured set of product groups can be selected to maximize the combination of (1) the coverage of the products in the result group by the products in the featured set of product groups and (2) the relevance of the products in the featured set of product groups, thus yielding a maximum relevance coverage of the featured set of product groups. In many embodiments, the maximum relevance coverage of the featured set of product groups can be determined at least in part by using at least one of a branch-and-bound algorithm and/or a greedy weighted set cover algorithm. In many embodiments, the selection can be performed via an extended vertex cover algorithm. For example, the selection can be performed using semantic graphs on products rather than being performed on tree-like category taxonomies. In a number of embodiments, the selection of the featured set of the product groups is not performed using a ranking algorithm. For example, branch-and-bound techniques can be used to find the attribute and a set of N values that maximize relevance, such as under the relevance function. In many embodiments, system 300 (FIG. 3) can store the best scoring set of product groups discovered so far with its score. For each attribute, such as in the result set of attributes or the subset of the result set of attributes, system 300 (FIG. 3) can estimate an upper bound on the best set of product groups that can be obtained with the attribute. If the estimate is lower than the best score so far, system 300 (FIG. 3) can proceed to the next attribute. In many embodiments, system 300 (FIG. 3) can use a weighted set cover algorithm with the attribute having the best score so far for pruning in order to find the best set of values.

Alternatively, or additionally, system 300 (FIG. 3) also can determine the featured set of product groups based at least in part on other factors, such as, for example, an estimated engagement, coverage, and/or consistency of the product groups. In a number of embodiments, each of the product groups of the featured set of the product groups can have an overlap with any other of the product groups of the feature set of product groups of no more than a maximum overlap percentage. In certain embodiments, the maximum overlap percentage can be 50%. In other embodiments, the maximum overlap percentage can be 5% to 80%. In several embodiments, a quantity of the product groups in the featured set of product groups can be between 3 and 10. In many embodiments, each of the product groups of the featured set of product groups has at least five products. In many embodiments, the result group of the products is covered by the products in the product groups of the featured set of product groups by at least a minimum coverage percentage. In certain embodiments, the minimum coverage percentage is 30%. In other embodiments, the minimum coverage percentage is 10% to 90%. In many embodiments, at least one of the products in each of the product groups of the featured set of product groups includes a representative product image, such as featured product group images 432, 442, or 452 (FIG. 4).

In many embodiments, method 500 can include block 505 of encoding for display on a website at least one page having an option to view each of the featured product groups. Additionally or alternatively, block 505 can include transmitting for display at least one page of the website, where the page has an option to view each of the featured product groups. The page encoded or transmitted for display can be identical or similar to web page 400 (FIG. 4), which can include the featured set of product groups, such as featured set of product groups 420 (FIG. 4). In many embodiments, upon a user selecting a featured product group (e.g., 430, 440, 450 (FIG. 4)), such as by clicking on one of featured product groups 430, 440, or 450 (FIG. 4), web server 320 (FIG. 3) can send a web page displaying the products in the selected featured product group (e.g., 430, 440, 450 (FIG. 4)).

In many embodiments, block 505 is performed after receiving a query from the user, such as by a user entering a search query in search box 460 (FIG. 4). In many embodiments, the featured set of product groups is pre-computed for the query prior to receiving the query from the user. In various embodiments, the featured set of product groups can be generated for the top M queries. For example, M can be 1,000 or another suitable number. For a search engine with high emphasis on precision, more than half of the queries may not have any featured set of product groups. In some embodiments, the featured set of product groups can be regenerated periodically, as old featured product groups can become stale based on changes to the product inventory. For example, the featured set of product groups can be regenerated every month or two.

In many embodiments, the featured set of product groups selected by system 300 (FIG. 3) can be passed through a verification process. For example, a manual sanity check can be used in which merchants and/or product experts verify the appropriateness of the featured set of product groups that were selected by system 300 (FIG. 3). Alternatively, or additionally, the featured set of product groups can be verified, automatically and not manually, on a fraction of web traffic to the website that searches for the query before it is used for all of the web traffic to the website that searches for the query. The automatic verification process can include measuring the utility of the featured product groups, such as by measuring the number of clicks on the featured product groups and/or clicks on products within a featured product group, and using the statistics to determine whether to retain the featured set of product groups for all web traffic.

Turning ahead in the drawings, FIG. 6 illustrates a flow chart for an embodiment of block 502 of determining a subset of the result set of the attributes. Block 502 is merely exemplary and is not limited to the embodiments presented herein. Block 502 can be employed in many different embodiments or examples not specifically depicted or described herein. In some embodiments, the procedures, the processes, and/or the activities of block 502 can be performed in the order presented. In other embodiments, the procedures, the processes, and/or the activities of block 502 can be performed in any suitable order. In still other embodiments, one or more of the procedures, the processes, and/or the activities of block 502 can be combined or skipped.

Referring to FIG. 6, in some embodiments block 502 can include block 601 of determining at least one of frequencies or scores of the attributes of the products in the result group. For example, certain attributes can be included in only a few products in the result group, and other attributes can be included in many or all products in the result group. The subset of the result set of the attributes can be based at least in part on the frequencies and/or scores of the attributes of the products in the result group.

In many embodiments, block 502 in FIG. 6 also can include block 602 of determining at least one of frequencies or scores of the attribute-value pairs of the products in the result group of the products. For example, certain attribute-value pairs can be included in only a few products in the result group, and other attributes can be included in several products in the result group. The subset of the result set of the attributes can be based at least in part on the frequencies and/or scores of the attribute-value pairs of the products in the result group.

Figure 7:
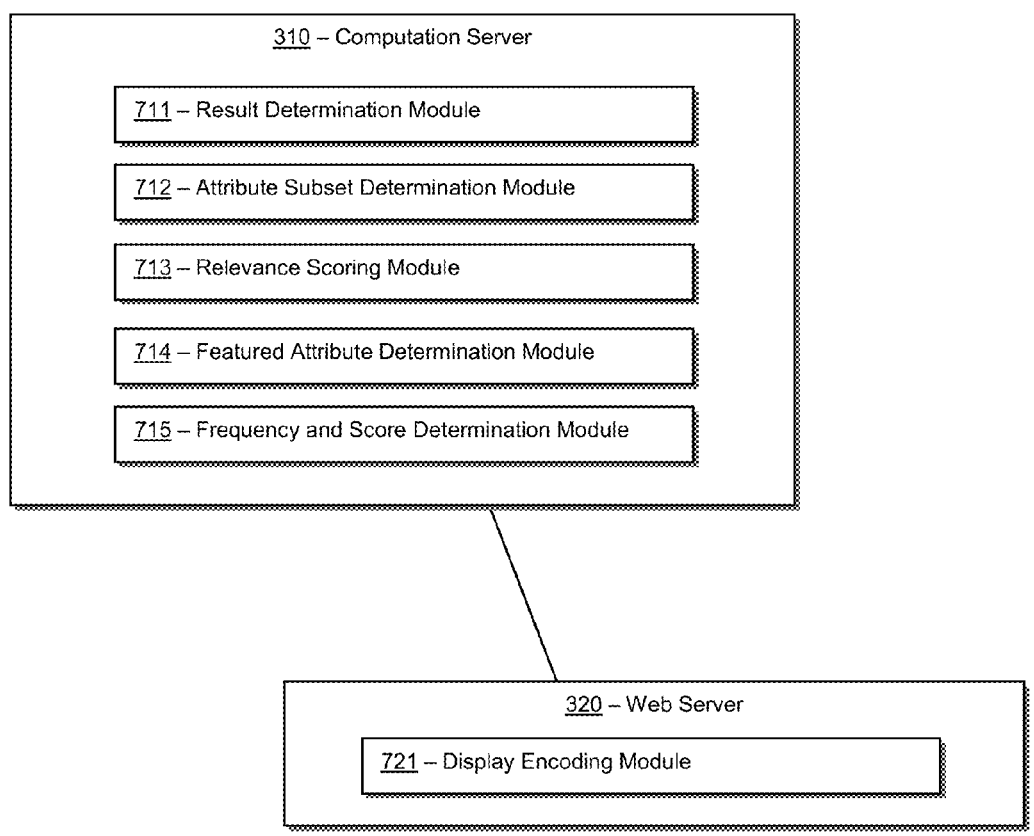
FIG. 7 illustrates a block diagram of an example of various components of the system of FIG. 3.

Turning ahead in the drawings, FIG. 7 illustrates a block diagram of system 300, according to the embodiment shown in FIG. 3. Computation server 310 and web server 320 are merely exemplary and are not limited to the embodiments presented herein. Computation server 310 and web server 320 can be employed in many different embodiments or examples not specifically depicted or described herein. In some embodiments, certain elements or modules of computation server 310 and/or web server 320 can perform various procedures, processes, and/or acts. In other embodiments, the procedures, processes, and/or acts can be performed by other suitable elements or modules.

In a number of embodiments, computation server 310 can include a result determination module 711. In certain embodiments, result determination module 711 can perform block 501 (FIG. 5) of determining a result group of products matching the query. In some embodiments, computation server 310 can include an attribute subset determination module 712. In certain embodiments, attribute subset determination module 712 can perform block 502 (FIG. 5) of determining a subset of the result set of the attributes.

In various embodiments, computation server 310 can include a relevance scoring module 713. In certain embodiments, relevance scoring module 713 can perform block 503 (FIG. 5) of determining relevance scores for the product groups. In many embodiments, computation server 310 can include a feature attribute determination module 714. In certain embodiments, feature attribute determination module 714 can perform block 504 (FIG. 5) of determining a featured attribute and the featured set of the product groups. In various embodiments, computation server 310 can include a frequency and score determination module 715. In certain embodiments, frequency and score determination module 715 can perform block 601 (FIG. 6) of determining frequencies and/or score of the attributes of the products in the result group and/or block 602 (FIG. 6) of determining the frequencies and/or scores of the attribute-value pairs of the products in the result group of the products.

In many embodiments, web server 320 can include a display encoding module 721. In certain embodiments, display encoding module 721 can perform block 505 (FIG. 5) of encoding for display on a website at least one page having an option to view each of the featured product groups.

Although selection of featured product groups has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 5-6 may include different procedures, processes, and/or activities and be performed by many different modules, in many different orders. As another example, the modules within computation server 310 and web server 320 in FIG. 7 can be interchanged or otherwise modified.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of computing a featured set of product groups for a query on an inventory of products, each of the products having one or more attribute-value pairs, and each of the one or more attribute-value pairs having an attribute, the method being implemented via execution of computer instructions configured to run at one or more processors and configured to be stored at one or more non-transitory computer-readable media, the method comprising:

determining, via a search engine, a result group of the products matching the query, the result group of the products collectively having a result set of attributes and a result set of the one or more attribute-value pairs, wherein:
  (a) the result set of the attributes in the result group of the products that match terms of the query comprise a union of all attributes in the product groups of the products; and
  (b) the result set of the one or more attribute-value pairs in the result group of the products that match the terms of the query comprise a union of all attribute-value pairs in the product groups of the products;

determining relevance scores for the product groups, wherein each product in the product groups shares a common attribute of the result set of the attributes, based on a relevance function, wherein the relevance function is configured to use a weighted set cover for the each of the products in the product groups that matches the query, wherein the weighted set cover is determined by:

relevance (query, {pg1, pg2, . . . , pgN})= ΣrelevanceBase (query, product)

for all products in (pg1∪pg2∪ . . . ∪pgN), where pgX is a product group X, and N is a number of first product groups included in a set of the product groups, and the relevanceBase is a scoring function, wherein two product groups in the set of the product groups do not overlap by a pre-determined percentage;

selecting each of the products in each of the product groups comprising the common attribute of the result set of the attributes and a common attribute-value pair associated with the common attribute of the result set of the attributes, as one of the products to be featured in the featured set of the product groups;

determining a set of featured attributes corresponding to the featured set of the product groups, wherein the each of the products in the product groups of the featured set of the product groups comprises a different one of the one or more attribute-value pairs associated with the set of featured attributes; and after receiving the query from a user, transmitting for display at least one page of a website, where the at least one page has an option to view the each of the product groups of the featured set of the product groups.

2. The method of claim 1, wherein:
the search engine is tuned for recall tuning, wherein the recall tuning comprises a measure of a percentage of relevant results retrieved in a search.

3. The method of claim 1, further comprising:
determining a subset of the result set of the attributes, wherein:
  determining the relevance scores for the product groups comprises iterating through each of the attributes in the subset of the result set of the attributes to determine, for each of the attributes, the relevance scores for the product groups in which all of the products have the common attribute.

4. The method of claim 3, wherein:
determining the subset of the result set of the attributes comprises determining at least one of first frequencies or first scores of the attributes of the products in the result group of the products,
wherein:
  the subset of the result set of the attributes is based at least in part on the at least one of the first frequencies or the first scores of the attributes of the products in the result group of the products.

5. The method of claim 4, wherein:
determining the subset of the result set of the attributes further comprises determining at least one of second frequencies or second scores of the one or more attribute-value pairs of the products in the result group of the products,
wherein:
  the subset of the result set of the attributes is based at least in part on the at least one of the second frequencies or the second scores of the one or more attribute-value pairs of the products in the result group of the products.

6. The method of claim 1, wherein:
determining the set of featured attributes corresponding to the featured set of the product groups comprises determining the set of featured attributes corresponding to the featured set of the product groups for a featured attribute based at least in part on a maximum relevance coverage of the featured set of the product groups; and
the maximum relevance coverage of the featured set of the product groups is determined at least in part by using at least one of a branch-and-bound algorithm.

7. The method of claim 1, wherein:
determining the relevance scores for the product groups further comprises determining, for each of the product groups, the relevance scores for products in a product group of the product groups based at least in part on at least one of: (a) a textual matching of the products in the product group with the query; (b) a revenue of the products in the product group; (c) a coverage of the result group of the products matching the query by the products in the product group; (d) a quantity of clicks on the products in the product group; or (e) a user engagement measure for the products in the product group.

8. The method of claim 7, wherein:
the revenue of the products in the product group is adjusted by a decay function.

9. The method of claim 7, wherein:
the quantity of clicks on the products in the product group is adjusted by a decay function.

10. The method of claim 7, wherein:
the user engagement measure comprises a combination of at least the quantity of clicks on the products in the product group, a quantity of cart adds for the products in the product group, and a quantity of orders of the products in the product group.

11. The method of claim 1, wherein:
each of the product groups of the featured set of the product groups has an overlap with any other of the product groups of the featured set of the product groups of no more than a maximum overlap percentage.

12. The method of claim 11, wherein:
the maximum overlap percentage is 50%.

13. The method of claim 1, wherein:
a quantity of the product groups in the featured set of the product groups is between 3 and 10.

14. The method of claim 1, wherein:
each of the product groups of the featured set of the product groups has at least five products.

15. The method of claim 1, wherein:
the result group of the products matching the query is covered by the products in the product groups of the featured set of the product groups by at least a minimum coverage percentage.

16. The method of claim 15, wherein:
the minimum coverage percentage is 30%.

17. The method of claim 1, wherein
at least one of the products in each of the product groups of the featured set of the product groups includes a representative product image.

18. The method of claim 1, wherein:
the featured set of the product groups is verified on a fraction of web traffic to the website that searches for the query before it is used for all of the web traffic to the website that searches for the query.

19. The method of claim 1, wherein:
the featured set of the product groups is pre-computed for the query prior to receiving the query from the user.

20. A system for computing a featured set of product groups for a query on an inventory of products, each of the products having one or more attribute-value pairs, and each of the one or more attribute-value pairs having an attribute, the system comprising:
one or more processing modules; and
one or more non-transitory memory storage modules storing computing instructions configured to run on the one or more processing modules and perform acts of:
determining, via a search engine, a result group of the products matching the query, the result group of the products collectively having a result set of attributes and a result set of the one or more attribute-value pairs, wherein:
(a) the result set of the attributes in the result group of the products that match terms of the query comprise a union of all attributes in product groups of the products; and
(b) the result set of one or more attribute-value pairs in the result group of the products that match the terms of the query comprise a union of all attribute-value pairs in the product groups of the products;
determining relevance scores for the product groups, wherein each product in the product groups shares a common attribute of the result set of the attributes based on a relevance function, wherein the relevance function is configured to use a weighted set cover for the each of the products in the product groups that matches the query, wherein the weighted set cover is determined by:

relevance(query,{pg1,pg2, . . . ,pg$N$})= $\Sigma$relevanceBase(query,product)

for all products in (pg1∪pg2∪ . . . ∪pgN), where pgX is a product group X, and N is a number of the product groups included in a set of the product groups, and the relevanceBase is a scoring function, wherein two product groups in the set of the product groups do not overlap by a pre-determined percentage;

selecting each of the products in each of the product groups comprising the common attribute of the result set of the attributes and a common attribute-value pair associated with the common attribute of the result set of the attributes, as one of the products to be featured in the featured set of the product groups;

determining a set of featured attributes corresponding to the featured set of the product groups, wherein the each of the products in the product groups of the featured set of the product groups comprises a different one of the one or more attribute-value pairs associated with the set of featured attributes; and after receiving the query from a user, transmitting for display at least one page of a website, where the at least one page has an option to view the each of the product groups of the featured set of the product groups.

* * * * *